United States Patent
Kim et al.

(10) Patent No.: US 12,283,716 B2
(45) Date of Patent: Apr. 22, 2025

(54) SEPARATOR HAVING HEAT RESISTANT LAYER FOR ELECTROCHEMICAL DEVICE AND SECONDARY BATTERY COMPRISING SAME

(71) Applicant: LG ENERGY SOLUTION, LTD., Seoul (KR)

(72) Inventors: Chan-Jong Kim, Daejeon (KR); So-Mi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 545 days.

(21) Appl. No.: 17/632,631

(22) PCT Filed: Aug. 14, 2020

(86) PCT No.: PCT/KR2020/010921
§ 371 (c)(1),
(2) Date: Feb. 3, 2022

(87) PCT Pub. No.: WO2021/034060
PCT Pub. Date: Feb. 25, 2021

(65) Prior Publication Data
US 2022/0294078 A1 Sep. 15, 2022

(30) Foreign Application Priority Data
Aug. 16, 2019 (KR) .................. 10-2019-0100503

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 10/4235* (2013.01);
(Continued)

(58) Field of Classification Search
CPC ............. H01M 50/449; H01M 50/489; H01M 50/417; H01M 50/426
See application file for complete search history.

(56) References Cited

U.S. PATENT DOCUMENTS

2010/0173187 A1  7/2010  Nishikawa et al.
2013/0115484 A1  5/2013  Li et al.
(Continued)

FOREIGN PATENT DOCUMENTS

CN    102969473 A    3/2013
CN    103733380 A    4/2014
(Continued)

OTHER PUBLICATIONS

Dumont et al. "Competition between Al2O3 atomic layer etching and AlF3 atomic layer deposition using sequential exposures of trimethylaluminum and hydrogen fluoride", The Journal of Chemical Physics, vol. 146, No. 052819, 2017, pp. 1-10.
(Continued)

*Primary Examiner* — Olatunji A Godo
(74) *Attorney, Agent, or Firm* — Birch, Stewart, Kolasch & Birch, LLP (57) ABSTRACT

The separator according to the present disclosure and the electrochemical device including the same show low internal resistance between the separator and an electrode. The separator includes heat resistant particles in a heat resistant coating layer. The heat resistant particles include a particle-shaped inorganic material and fluorine (F) doped to a surface of the inorganic particles. When the internal temperature of a battery is increased during the operation of the battery, the separator shows improved heat resistance by virtue of an endothermic effect derived from a phase change of the heat resistant particles. In addition, decomposition of a lithium salt used as an ingredient of electrolyte is inhibited by the fluorine atoms introduced to the heat resistant particles,
(Continued)

resulting in improvement of ion conductivity and resistance characteristics. Further, the separator including the heat resistant particles introduced thereto has excellent resistance characteristics and shows high oxidation stability of an electrolyte, resulting in improvement of the electrochemical stability of a battery.

11 Claims, 2 Drawing Sheets

(51) Int. Cl.
      *H01M 10/42*       (2006.01)
      *H01M 50/417*     (2021.01)
      *H01M 50/426*     (2021.01)
      *H01M 50/431*     (2021.01)
      *H01M 50/446*     (2021.01)
      *H01M 50/489*     (2021.01)

(52) U.S. Cl.
      CPC ....... *H01M 50/417* (2021.01); *H01M 50/426* (2021.01); *H01M 50/431* (2021.01); *H01M 50/446* (2021.01); *H01M 50/489* (2021.01)

(56) References Cited

U.S. PATENT DOCUMENTS

| | | |
|---|---|---|
| 2013/0149587 A1 | 6/2013 | Yu et al. |
| 2013/0171500 A1 | 7/2013 | Xu et al. |
| 2013/0252066 A1 | 9/2013 | Yeou et al. |
| 2014/0186680 A1 | 7/2014 | Kim et al. |
| 2015/0155539 A1* | 6/2015 | Park ................. H01M 50/451 525/244 |
| 2019/0189987 A1 | 6/2019 | Yang et al. |
| 2019/0207191 A1* | 7/2019 | Huang ............... H01M 50/423 |

FOREIGN PATENT DOCUMENTS

| | | |
|---|---|---|
| CN | 104393219 A | 3/2015 |
| CN | 106450109 A | 2/2017 |
| CN | 109742298 A | 5/2019 |
| EP | 2 169 743 A1 | 3/2010 |
| EP | 3 096 387 A1 | 11/2016 |
| EP | 3 379 602 A1 | 9/2018 |
| JP | 2011-18588 A | 1/2011 |
| JP | 2012-99349 A | 5/2012 |
| JP | 2013-197092 A | 9/2013 |
| JP | 2015-536030 A | 12/2015 |
| KR | 10-2007-0082579 A | 8/2007 |
| KR | 10-2008-0072340 A | 8/2008 |
| KR | 10-2010-0036137 A | 4/2010 |
| KR | 10-2011-0075631 A | 7/2011 |
| KR | 10-1125013 B1 | 3/2012 |
| KR | 10-2013-0059632 A | 6/2013 |
| KR | 10-2016-0130716 A | 11/2016 |
| KR | 10-1926784 B1 | 12/2018 |

OTHER PUBLICATIONS

International Search Report (PCT/ISA/210) issued in PCT/KR2020/010921, dated Nov. 25, 2020.
Extended European Search Report dated Dec. 2, 2022 for European Patent Office Application No. 20855024.4.

* cited by examiner

SEPARATOR HAVING HEAT RESISTANT LAYER FOR ELECTROCHEMICAL DEVICE AND SECONDARY BATTERY COMPRISING SAME

TECHNICAL FIELD

The present application claims priority to Korean Patent Application No. 10-2019-0100503 filed on Aug. 16, 2019 in the Republic of Korea. The present disclosure relates to a separator for an electrochemical device having improved heat resistance and stability. The electrochemical device may be a primary battery or a secondary battery, and the secondary battery includes a lithium ion secondary battery.

BACKGROUND ART

Recently, energy storage technology has been given an increasing attention. Efforts into research and development of electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte. However, such lithium ion batteries have a safety-related problem, such as ignition and explosion, caused by the use of an organic electrolyte and require a complicated manufacturing process undesirably. More recently, lithium ion polymer batteries have improved the above-mentioned disadvantages of lithium ion batteries, and thus have been regarded as one of the next-generation batteries. However, such lithium ion polymer batteries have relatively lower capacity as compared to lithium ion batteries, and particularly show insufficient discharge capacity at low temperature. Therefore, there is an imminent need for solving the above-mentioned problem.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous polymer substrate used conventionally as a separator for an electrochemical device shows a severe heat shrinking behavior at a temperature of 100° C. or higher due to its material property and a characteristic during its manufacturing process, including orientation, thereby causing a short-circuit between a positive electrode and a negative electrode.

To solve the above-mentioned safety problem of electrochemical devices, there has been suggested a separator having a porous composite coating layer by coating a mixture of inorganic particles with a binder polymer on at least one surface of a sheet (substrate) for a porous separator. The inorganic particles contained in the coating layer have higher heat resistance as compared to polymeric materials. Therefore, an effect of preventing a short-circuit between a positive electrode and a negative electrode was obtained, even when an electrochemical device is overheated, as compared to a separator including a substrate using a polymeric material alone. However, formation of such a composite coating layer tends to reduce interfacial resistance between an electrode and a separator and causes the problem of degradation of the oxidation stability of an electrolyte due to oxidation of inorganic particles during repetition of charge/discharge cycles.

DISCLOSURE

Technical Problem

The present disclosure is designed to solve the problems of the related art, and therefore the present disclosure is directed to providing a separator including a heat resistant coating layer and an electrochemical device including the same. The present disclosure is also directed to providing a separator which includes a heat resistant coating layer containing inorganic particles having improved oxidation stability and shows reduced interfacial resistance between the separator and an electrode, and an electrochemical device including the same. It will be easily understood that the objects and advantages of the present disclosure may be realized by the means shown in the appended claims and combinations thereof.

Technical Solution

According to the first embodiment of the present disclosure, there is provided a separator for an electrochemical device including a porous polymer substrate, and a heat resistant coating layer on at least one surface of the porous polymer substrate, wherein the heat resistant coating layer includes heat resistant particles and the heat resistant particles comprise a particle-shaped inorganic material, and fluorine (F) atoms doped to a surface of the particle-shaped inorganic material.

According to the second embodiment of the present disclosure, there is provided the separator for an electrochemical device as defined in the first embodiment, wherein the particle-shaped inorganic material is stable against oxidation and/or reduction in the range of operating voltage of an electrochemical device.

According to the third embodiment of the present disclosure, there is provided the separator for an electrochemical device as defined in the first or the second embodiment, wherein the heat resistant particles include at least one of alumina ($Al_2O_3$), aluminum hydroxide ($Al(OH)_3$), boehmite (AlOOH), $Mg(OH)_2$ or $B(OH)_3$, and the heat resistant particles comprise fluorine (F) atoms doped to the surface, and the heat resistant particles have a particle shape.

According to the fourth embodiment of the present disclosure, there is provided the separator for an electrochemical device as defined in any one of the first to the third embodiments, wherein the heat resistant particles include at least one of alumina ($Al_2O_3$), aluminum hydroxide ($Al(OH)_3$) or boehmite (AlOOH), the heat resistant particles comprise fluorine (F) atoms doped to the surface, and the heat resistant particles have a particle shape, and the fluorine (F) atoms are doped in the form of $AlF_3$.

According to the fifth embodiment of the present disclosure, there is provided the separator for an electrochemical device as defined in any one of the first to the fourth embodiments, wherein the heat resistant particles include aluminum hydroxide $(Al(OH)_3)$ containing fluorine (F) atoms doped to the surface and aluminum hydroxide $(Al(OH)_3)$ has a particle shape.

According to the sixth embodiment of the present disclosure, there is provided the separator for an electrochemical device as defined in any one of the first to the fifth embodiments, wherein the heat resistant particles contain fluorine (F) atoms at 5 atomic % or more on the surface of the heat resistance particles.

According to the seventh embodiment of the present disclosure, there is provided the separator for an electrochemical device as defined in any one of the first to the sixth embodiments, wherein the fluorine atoms are doped to the surfaces of the heat resistant particles by mixing an aqueous hydrogen fluoride (HF) solution with an inorganic material and carrying out a heat treatment.

According to the eighth embodiment of the present disclosure, there is provided the separator for an electrochemical device as defined in any one of the first to the seventh embodiments, wherein the heat resistant particles are present in an amount of 50 wt % or more based on 100 wt % of the inorganic particles present in the heat resistant coating layer.

According to the ninth embodiment of the present disclosure, there is provided the separator for an electrochemical device as defined in any one of the first to the eighth embodiments, wherein the heat resistant particles have an average particle diameter of 0.01 μm to 2 μm.

According to the tenth embodiment of the present disclosure, there is provided the separator for an electrochemical device as defined in any one of the first to the ninth embodiments, wherein the heat resistant coating layer has a packing density of 0.8 $g/cm^3$ or more, and has a resistance of less than 1 ohm when the heat resistant coating layer of the separator has a thickness of less than 10 μm.

According to the eleventh embodiment of the present disclosure, there is provided an electrochemical device including a negative electrode, a positive electrode, a separator interposed between the negative electrode and the positive electrode, and an electrolyte, wherein the separator is the separator for an electrochemical device as defined in any one of the first to the ninth embodiments, and the electrolyte includes, as a lithium salt, at least one of $LiPF_6$, $LiBF_4$, $LiAsF_6$, $LiCF_3SO_3$, $LiN(CF_3SO_2)_2$ or $LiC(CF_2SO_2)_3$.

Advantageous Effects

The separator according to the present disclosure and the electrochemical device including the same show low internal resistance between the separator and an electrode. The separator includes heat resistant particles in a heat resistant coating layer, and the heat resistant particles include fluorine (F) doped to the surfaces of inorganic particles. When the internal temperature of a battery is increased during the operation of the battery, the separator shows improved heat resistance by virtue of an endothermic effect derived from a phase change of the heat resistant particles. In addition, decomposition of a lithium salt used as an ingredient of electrolyte is inhibited by the fluorine atoms introduced to the heat resistant particles, resulting in improvement of ion conductivity and resistance characteristics. Further, the separator including the heat resistant particles introduced thereto has excellent resistance characteristics and shows high oxidation stability of an electrolyte, resulting in improvement of the electrochemical stability of a battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a separator for an electrochemical device and an electrochemical device including the same. According to an embodiment of the present disclosure, the electrochemical device means a device converting chemical energy into electrical energy by electrochemical reactions, and has a concept covering a primary battery and a secondary battery. In addition, the secondary battery is a rechargeable battery, and has a concept covering a lithium ion battery, nickel-cadmium battery, nickel-metal hydride battery, or the like.

The separator according to an embodiment of the present disclosure includes a heat resistant coating layer containing heat resistant particles. The heat resistant particles contain fluorine (F) atoms introduced to the surface of a particle-shaped inorganic material, and are advantageous to improvement of the heat resistance and stability of the separator.

Hereinafter, the separator according to an embodiment of the present disclosure will be explained in more detail.

1. Separator (Structure of Separator) The separator according to an embodiment of the present disclosure includes a porous substrate having a plurality of pores and a heat resistant coating layer formed on at least one surface of the porous substrate.

According to an embodiment of the present disclosure, the separator may have a thickness of 5-20 μm and the thickness may be controlled suitably within the above-defined range. For example, the separator may have a thickness of 18 μm or less, or 15 μm or less. In addition, the separator may have a porosity of about 38-60 vol %. The term 'porosity' means a ratio of the volume occupied by pores based on the volume of a separator, is expressed in the unit of vol %, and may be used exchangeably with the term 'pore ratio', 'porous degree', or the like. In general, pores in a secondary battery should retain such a size that an internal short-circuit may be prevented.

1) Porous Substrate

The porous substrate means a porous ion-conducting barrier which allows ions to pass therethrough, while interrupting an electrical contact between a negative electrode and a positive electrode, and has a plurality of pores formed therein. The pores are interconnected so that gases or liquids may pass from one surface of the substrate to the other surface of the substrate.

Materials forming the porous substrate may be any organic materials or inorganic materials having electrical insulation property. Particularly, with a view to imparting a shut-down function to a substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may include at least one polymer resin selected from polyethylene terephthalate, polybutylene terephthalate, polyacetal, polyamide, polycarbonate, polyimide, polyetheretherketone, polyether sulfone, polyphenylene oxide, polyphenylene sulfide and polyethylene naphthalene. The porous substrate may include a non-woven web, a porous polymer film, or a laminate of two or more layers thereof, but is not limited thereto.

Particularly, the porous polymer substrate may be any one of the following a) to e):

a) A porous film formed by melting and extruding a polymer resin;

b) A multilayer film formed by stacking two or more layers of the porous films of a);

c) A non-woven web formed by integrating filaments obtained by melting/spinning a polymer resin;

d) A multilayer film formed by stacking two or more layers of the non-woven webs of c); and e) A porous composite film having a multilayer structure including two or more of a) to d).

According to the present disclosure, the porous substrate preferably has a thickness of 3-12 μm, or 5-12 μm. When the thickness is smaller than the above-defined range, it is not possible to obtain a sufficient conducting barrier function. On the other hand, when the thickness is excessively larger than the above-defined range (i.e. the porous substrate is excessively thick), the separator may show excessively increased resistance.

According to an embodiment of the present disclosure, polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult. In addition, the porous substrate may have a puncture strength of 300 gf or more in terms of improvement of production yield. The puncture strength of a porous substrate refers to the highest puncture load (gf) measured by carrying out a puncture test with Kato tech KES-G5 handy compression tester under the conditions of a needle tip radius of curvature of 0.5 mm and a puncture rate of 2 mm/sec.

According to an embodiment of the present disclosure, the porous polymer substrate may be any porous polymer substrate as long as it is a planar porous polymer substrate used for an electrochemical device. For example, an insulating thin film showing high ion permeability and mechanical strength and generally having a pore diameter of 10-100 nm and a thickness of 5-12 μm may be used.

2) Heat Resistant Coating Layer

According to the present disclosure, the separator includes a heat resistant coating layer formed on one surface of the porous substrate, and the heat resistant coating layer includes heat resistant particles. According to the present disclosure, the heat resistant particles contain fluorine (F) atoms introduced to the surface of a particle-shaped inorganic material. According to an embodiment of the present disclosure, when fluorine (F) is introduced to the heat resistant particles in an excessively small amount, it is not possible to obtain a desired effect sufficiently. Therefore, the ingredient ratio of fluorine (F) on the surfaces of the heat resistant particles may be controlled to about 5 atomic % or more. In addition, according to an embodiment of the present disclosure, the content of fluorine (F) atoms introduced to the surfaces of the heat resistant particles may be determined by using an elemental analyzer, such as energy dispersive X-ray spectroscopy.

According to an embodiment of the present disclosure, there is no particular limitation in the inorganic materials that may be used as the heat resistant particles, as long as they are electrochemically stable. For example, there is no particular limitation in the inorganic materials, as long as they are stable against oxidation and/or reduction in the range (e.g. 0-5V based on Li/Li$^+$) of operating voltage of an electrochemical device to which the separator according to the present disclosure is applied.

According to an embodiment of the present disclosure, such inorganic materials may include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, AlOOH, $Al(OH)_3$, SiC, $B(OH)_3$, $Mg(OH)_2$, $TiO_2$, or the like, and at least one of them may be used as materials of the heat resistant particles.

According to an embodiment of the present disclosure, when using an inorganic material having a high dielectric constant, it is possible to improve the ion conductivity of an electrolyte by increasing the dissociation degree of an electrolyte salt, such as a lithium salt, in a liquid electrolyte. For these reasons, the inorganic particles may include inorganic particles having a dielectric constant of 5 or more, particularly 10 or more.

In addition, the inorganic material may include an inorganic material having lithium ion transportability, i.e. an inorganic material which contains elemental lithium and does not store lithium but transports lithium ions. Non-limiting examples of the inorganic material having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as LiI—$Li_2S$—$P_2S_5$, or a mixture thereof.

Meanwhile, methods for introducing fluorine (F) are not particularly limited, as long as fluorine (F) can be introduced to the surfaces of the inorganic particles. According to an embodiment of the present disclosure, heat resistant particles containing fluorine introduced to the surfaces thereof may be obtained by the following method.

First, aqueous HF solution is prepared at a predetermined concentration. The concentration of HF in the aqueous solution may be about 5 wt %. The concentration may be controlled suitably considering the amount of fluorine (F) introduced to the surfaces of the particles. Next, inorganic particles are introduced to the prepared aqueous solution. Particular examples of the inorganic particles may include at least one of alumina ($Al_2O_3$), aluminum hydroxide ($Al(OH)_3$), boehmite (AlOOH) and $B(OH)_3$ (orthoboric acid). Herein, HF and the inorganic particles may be mixed at a mixing ratio of 1.25M:1M (HF:inorganic particles). Then, the aqueous solution containing the inorganic particles introduced thereto is subjected to centrifugal separation at room temperature under a rate of about 3000 rpm for 30 minutes to remove the solvent, and the particles are recovered. After that, the recovered particles are heat treated at about 100-150° C. so that fluorine (F) atoms may be introduced to the surfaces of the particles.

According to an embodiment of the present disclosure, the heat resistant coating layer of the separator may further include inorganic particles having no fluorine atoms introduced thereto, in combination with the above-described heat resistant particles. As used herein, the term 'inorganic particles' refers to an inorganic material having a particle shape and containing no fluorine atoms introduced thereto. Herein, the inorganic material may include at least one of the above-mentioned inorganic materials. According to the present disclosure, in order to reduce resistance, to increase ion conductivity and to ensure heat resistance and stability, the content of the heat resistant particles may be 50 wt % or more, 70 wt % or more, or 90 wt % or more, based on 100 wt % of the total inorganic particles contained in the heat resistant coating layer.

Meanwhile, according to an embodiment of the present disclosure, the heat resistant particles may be at least one of alumina ($Al_2O_3$), aluminum hydroxide ($Al(OH)_3$), boehmite (AlOOH) and $B(OH)_3$ (orthoboric acid), containing fluorine (F) atoms introduced to the surfaces thereof, and have a particle shape. According to an embodiment, the content of fluorine (F) introduced to the heat resistant particles is about 5 atomic % or more, as expressed by the ingredient ratio of fluorine (F) on the surfaces of the heat resistant particles. According to an embodiment, when the heat resistant particles include aluminum (Al) in the case of alumina ($Al_2O_3$), aluminum hydroxide ($Al(OH)_3$) and boehmite (AlOOH), fluorine (F) may be introduced to the heat resistant particles in the form of $AlF_3$. According to another embodiment, when the heat resistant particles include boron (B) in the case of $B(OH)_3$ (orthoboric acid), fluorine (F) may be introduced to the heat resistant particles in the form of $BF_3$.

Since the heat resistant particles have high oxidation stability, it is possible to obtain an effect of improving the electrochemical stability of an electrochemical device. In addition, since the heat resistant particles can inhibit decomposition of a lithium salt in an electrolyte, it is possible to improve the electrochemical characteristics, such as ion conductivity and resistance characteristics, of a battery. Particularly, the heat resistant particles show a high effect of preventing decomposition of a fluorine-containing lithium salt, such as $LiPF_6$, among lithium salts.

In addition, the separator according to the present disclosure shows low resistance characteristics. For example, the separator shows a resistance of less than 1 ohm with the proviso that the heat resistant coating layer of the separator has a thickness of less than 10 μm. The thickness of the heat resistant coating layer refers to the thickness of the total heat resistant coating layers contained in the separator. When each of both surfaces of the separator includes a heat resistant coating layer, the thickness refers to the total thickness of the heat resistant coating layers on both surfaces.

In addition, the heat resistant coating layer shows high packing density of the particles (heat resistant particles and/or inorganic particles). According to an embodiment of the present disclosure, the heat resistant coating layer may show a packing density of the particles (heat resistant particles and/or inorganic particles) of 0.8 g/cm$^3$ or more, or 1.00 g/cm$^3$ or more.

According to an embodiment of the present disclosure, the heat resistant coating layer has an average pore size of 20-2,000 nm. Within the above-defined range, the heat resistant coating layer may have an average pore size of 1,500 nm or less, or 1,000 nm or less. Independently from this or in combination with this, the average pore size may be 20 nm or more, 50 nm or more, or 100 nm or more. For examples, the heat resistant coating layer may have an average pore size of 20-1,500 nm. The pore size may be calculated from image analysis through scanning electron microscopic (SEM) images. When the pore size is smaller than the above-defined range, the pores may be blocked with ease due to the swelling of the binder resin in the coating layer. When the pore size is not within the above-defined range, the resultant separator hardly functions as an insulating film and a secondary battery obtained by using the separator shows a problem of degradation of self-discharge characteristics.

According to an embodiment of the present disclosure, the heat resistant coating layer preferably has a porosity of 30-80%. A porosity of 30% or more is advantageous in terms of lithium ion permeability. In addition, a porosity of 80% or less is suitable for ensuring adhesion between a separator and an electrode, because the surface opening ratio is not excessively high in this case.

Meanwhile, according to the present disclosure, porosity and pore size may be determined by using BELSORP (BET system) available from BEL JAPAN Co. with an adsorption gas, such as nitrogen, or by using mercury intrusion porosimetry, capillary flow porosimetry, or the like. According to another embodiment of the present disclosure, the porosity of the porous coating layer may be calculated from the thickness and weight of the resultant coating layer and the theoretical density of the coating layer.

According to an embodiment of the present disclosure, the heat resistant coating layer preferably has a thickness of 1.5-5.0 μm on one surface of the porous substrate. Preferably, the thickness may be 1.5 μm or more. Within the above-defined range, it is possible to provide excellent adhesion to an electrode, and thus to increase the cell strength of a battery. Meanwhile, when the thickness is 5.0 μm or less, it is possible to provide advantageous effects in terms of cycle characteristics and resistance characteristics of a battery.

According to an embodiment of the present disclosure, there is no particular limitation in the average particle diameter of the inorganic particles and/or the heat resistant particles. However, the average particle diameter may be 0.01-2.0 μm preferably with a view to formation of a coating layer having a uniform thickness and suitable porosity. Within the above-defined range, the particle diameter may be 0.05 μm or more, 0.1 μm or more, or 0.5 μm or more. Independently from this or in combination with this, the particle diameter may be 1.5 μm or less, or 1 μm or less. When the particle diameter is smaller than 0.01 μm, dispersibility may be degraded. When the particle diameter is larger than 2.0 μm, the resultant coating layer may have an increased thickness.

Meanwhile, according to an embodiment of the present disclosure, the heat resistant coating layer includes a binder resin. The binder resin may be used in an amount of 30 wt % or less, 20 wt % or less, 10 wt % or less, 5 wt % or less, or 1 wt % or less, based on 100 wt % of the heat resistant coating layer. For example, the binder resin may be used in an amount of 5 wt % or less based on 100 wt % of the heat resistant coating layer. The binder resin includes a polyvinylidene fluoride-based resin (PVdF-based polymer resin), wherein the PVdF-based polymer resin is used preferably in an amount of 80 wt % or more, or 90 wt % or more, based on 100 wt % of the binder resin. The PVdF-based polymer resin has a weight average molecular weight of 600,000 or less, preferably 400,000 or less. When the weight average molecular weight is 600,000 or less, flexibility is increased to facilitate improvement of adhesion. Herein, the weight average molecular weight of the PVdF-based polymer resin may be obtained by gel permeation chromatography (GPC). The molecular weight may be expressed in the unit of g/mol.

In addition, according to an embodiment of the present disclosure, the heat resistant coating layer may include, as a binder resin, a polyvinylidene fluoride-based binder resin, a (meth)acrylic polymer resin or both. According to an embodiment of the present disclosure, the polyvinylidene fluoride-based binder resin may include vinylidene fluoride homopolymer (i.e. polyvinylidene fluoride), copolymer of vinylidene fluoride with a copolymerizable monomer, or a mixture thereof. According to an embodiment, particular examples of the monomer include fluorinated monomers and/or chlorinated monomers. Non-limiting examples of the fluorinated monomers include at least one selected from: vinyl fluoride; trifluoroethylene (TrFE); chlorofluoroethylene (CTFE); 1,2-difluoroethylene; tetrafluoroethylene (TFE); hexafluoropropylene (HFP); perfluoro(alkylvinyl) ether, such as perfluoro(methylvinyl)ether (PMVE), perfluoro(ethylvinyl)ether (PEVE) or perfluoro(propylvinyl)ether (PPVE); perfluoro(1,3-dioxole); perfluoro(2,2-dimethyl-1,3-dioxol) (PDD); or the like, and at least one of such fluorinated monomers may be used. The (meth)acrylic polymer includes (meth)acrylate as a monomer, and non-limiting examples of the (meth)acrylic polymer include those including, as a monomer, butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, lauryl (meth)acrylate, tetradecyl (meth)acrylate, or the like. The (meth)acrylic polymer may be used in an amount of 20 wt % or less based on 100 wt % of the total binder resins.

According to an embodiment of the present disclosure, the heat resistant coating layer may further include an additive, such as a dispersing agent and/or thickener, in an amount of 1-3 wt % based on 100 wt % of the heat resistant coating layer. According to an embodiment of the present disclosure, the additive may be at least one selected suitably from polyvinyl pyrrolidone (PVP), polyvinyl alcohol (PVA), hydroxyethyl cellulose (HEC), hydroxypropyl cellulose (HPC), ethylhydroxyethyl cellulose (EHEC), methyl cellulose (MC), carboxymethyl cellulose (CMC), hydroxyalkylmethyl cellulose and cyanoethylene polyvinyl alcohol.

2. Method for Manufacturing Separator

The separator according to an embodiment of the present disclosure may be obtained by applying slurry for forming a heat resistant coating layer including the binder resin and heat resistant particles and/or inorganic particles onto a porous substrate, and solidifying the binder resin to form a heat resistant coating layer integrally on the porous substrate.

Particularly, a binder resin is dissolved in a solvent to prepare a polymer solution. Next, heat resistant particles and/or inorganic particles are introduced to and mixed with the polymer solution to provide slurry for forming a heat resistant coating layer. According to an embodiment of the present disclosure, the slurry may further include an adequate amount of dispersing agent to increase the dispersibility of the inorganic particles and the binder resin. Then, the slurry is applied onto the porous substrate and is allowed to stand for a predetermined time to solidify (dry) the binder resin. In this manner, it is possible to form a heat resistant coating layer integrally on the porous substrate. The drying may be carried out by a conventional method, such as natural drying, air blowing drying, warm air drying, hot air drying, or the like. According to another embodiment of the present disclosure, the binder resin may be solidified through a humidified phase separation process which includes allowing the porous substrate coated with the slurry under a humidified condition with a relative humidity of 35% or more for several minutes to several tens of minutes. According to still another embodiment of the present disclosure, the binder resin may be solidified by dipping the porous substrate coated with the slurry in a non-solvent. When a non-solvent phase separation process or humidified phase separation process is used as a drying process, the heat resistant coating layer may have a single-side structure in which a large amount of the binder resin is localized on the surface portion.

The slurry may include, as a solvent, an ingredient capable of dissolving the PVdF-based resin. For example, the solvent may be selected suitably from acetone, methyl ethyl ketone, N-methyl pyrrolidone, polar amide solvent, such as dimethyl acetamide, or dimethyl formamide, or the like.

The slurry may be applied to the porous substrate by using a conventional coating method, such as Mayer bar coating, die coating, reverse roll coating, gravure coating, or the like.

In addition, the separator according to the present disclosure may be obtained by fabricating a heat resistant coating layer and a porous substrate separately, stacking and laminating them, and forming a composite through hot pressing or adhesion. To obtain a heat resistant coating layer as an independent sheet, a method including applying the slurry onto a release sheet, forming a heat resistant coating layer in the above-described manner, and removing only the heat resistant coating layer may be used.

3. Electrode Assembly Including Separator

In another aspect of the present disclosure, there is provided a secondary battery including the separator. The battery includes a negative electrode, a positive electrode and a separator interposed between the negative electrode and the positive electrode. The separator is the above-described heat resistant separator.

According to the present disclosure, the positive electrode includes a positive electrode current collector, and a positive electrode active material layer formed on at least one surface of the current collector and including a positive electrode active material, a conductive material and a binder resin. Particular examples of the positive electrode active material may include any one selected from layered compounds such as lithium manganese composite oxide ($LiMn_2O_4$, $LiMnO_2$ etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1), $Li_aMn_xNi_yCo_zO_2$ ($0.5<a<1.5$, $0<x, y, z<1$, $x+y+z=1$), or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or two or more of them.

According to the present disclosure, the negative electrode includes a negative electrode current collector, and a negative electrode active material layer formed on at least one surface of the current collector and including a negative electrode active material, a conductive material and a binder resin. Particular examples of the negative electrode active material may include any one selected from carbon such as non-graphitizable carbon, graphitic carbon, or the like; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0<x \leq 1$; $1 \leq y \leq 3$; $1 \leq z \leq 8$); lithium metal; lithium alloys; silicon-based alloys; tin-based alloys; metal oxides such as $SnO$, $SnO_2$, $PbO$, $PbO_3$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or a mixture of two or more of them.

According to an embodiment of the present disclosure, the conductive material may include any one selected from graphite, carbon black, carbon fibers or metallic fibers, metal powder, conductive whisker, conductive metal oxide, activated carbon and polyphenylene derivatives, or a mixture of two or more of them. More particularly, the conductive material may include any one selected from the group consisting of natural graphite, artificial graphite, Super-P, acetylene black, Ketjen black, channel black, furnace black, lamp black, thermal black, denka black, aluminum powder, nickel powder, zinc oxide, potassium titanate and titanium oxide, or a mixture of two or more of such conductive materials.

The current collector is not particularly limited, as long as it has high conductivity while not causing any chemical change in the corresponding battery. Particular examples of the current collector include stainless steel, copper, aluminum, nickel, titanium, baked carbon, or aluminum or stainless steel surface-treated with carbon, nickel, titanium, silver, or the like.

The binder resin may include a polymer used conventionally for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, or the like.

The electrode assembly obtained as described above is introduced to a suitable casing and an electrolyte is injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compound or a mixture thereof. However, the present disclosure is not limited thereto. Meanwhile, according to an embodiment of the present disclosure, the electrolyte may include a fluorinated compound as a lithium salt. For example, the fluorinated compound may include, as an anion, at least one of $PF_6^-$, $BF_4^-$, $AsF_6^-$, $CF_3SO_3^-$, $N(CF_3SO_2)_2^-$ and $C(CF_2SO_2)_3^-$. Particular examples of the lithium salt include of $LiPF_6$, $LiBF_4$, $LiAsF_6$, $LiCF_3SO_3$, $LiN(CF_3SO_2)_2$, $LiC(CF_2SO_2)_3$, or the like, and at least one of them may be used as an electrolyte.

In still another aspect of the present disclosure, there are provided a battery module which includes the battery including the electrode assembly as a unit cell, a battery pack including the battery module, and a device including the battery pack as a power source. Particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Preparation Example 1

Aqueous HF solution having a concentration of about 5 wt % was prepared. Next, $Al(OH)_3$ (Huber Co., $D_{50}$ 1.2 μm) powder was introduced to and agitated in the prepared aqueous solution so that it might be dispersed in the aqueous solution. Herein, HF and the inorganic particles were mixed at a ratio of 1.25M aqueous HF solution:1M $Al(OH)_3$. Then, the aqueous solution containing $Al(OH)_3$ introduced thereto was subjected to centrifugal separation at room temperature and a rate of about 3000 rpm for 30 minutes to remove the solvent and recover $Al(OH)_3$. After that, the recovered particles were heat treated in an oven heated to about 105° C. to obtain heat resistant particles.

Figure 1:
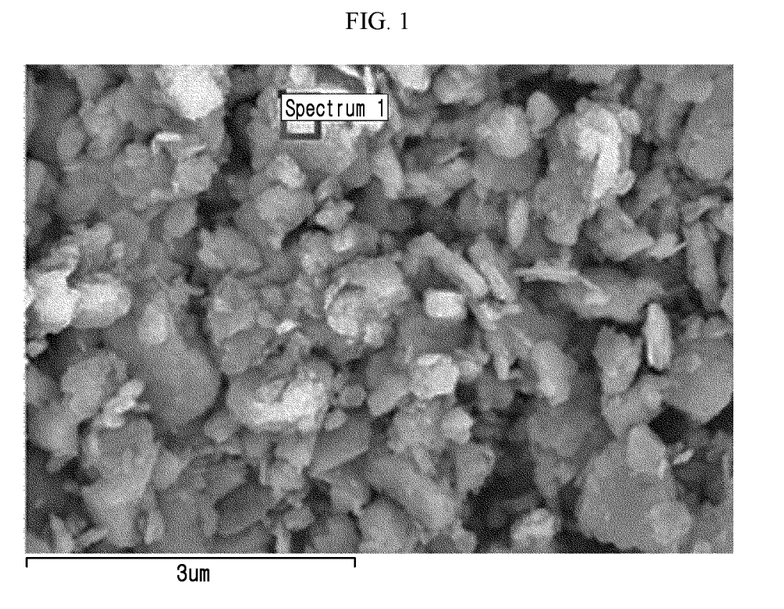
FIG. 1 illustrates the surface shape of fluorine-doped aluminum hydroxide obtained from Preparation Example 1 and the ingredient analysis region thereof determined by energy dispersive X-ray spectroscopy (EDX).
Figure 3:
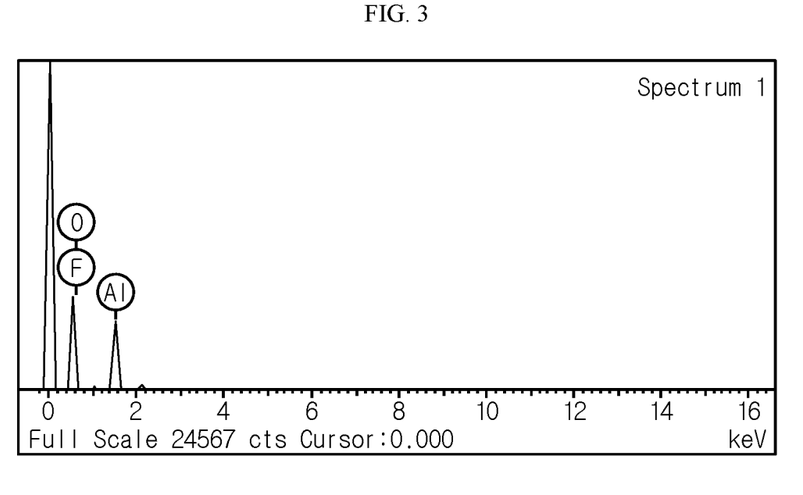
FIG. 3 illustrates a mapping graph obtained from the EDX analysis of the aluminum hydroxide containing fluorine particles introduced thereto according to Preparation Example 1.

FIG. 1 illustrates the surface shape of the obtained heat resistant particles and the ingredient analysis region thereof determined by energy dispersive X-ray spectroscopy (EDX). In addition, FIG. 3 illustrates the EDX mapping graph the obtained heat resistant particles. It can be seen that fluorine (F) is introduced to the surfaces of the particles at a ratio of 6.47 atomic %. The EDX analysis results of the surfaces of the heat resistant particles obtained as described above are shown in the following Table 1.

TABLE 1

| Element | Weight % | Atomic % |
| --- | --- | --- |
| Oxygen (O) | 65.31 | 74.59 |
| Fluorine (F) | 6.72 | 6.47 |
| Aluminum (Al) | 27.97 | 18.94 |
| Totals | 100 | 100 |

Figure 2:
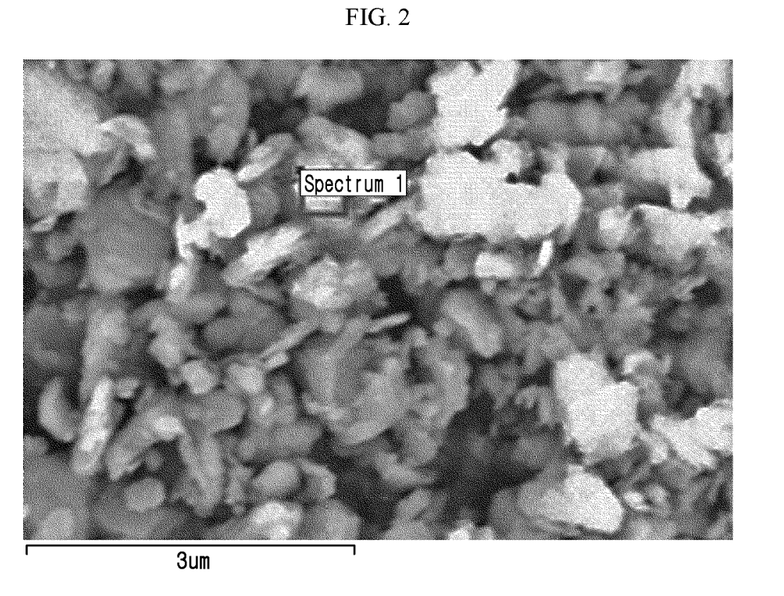
FIG. 2 illustrates the surface shape of aluminum hydroxide not doped with fluorine and the ingredient analysis region thereof determined by energy dispersive X-ray spectroscopy (EDX).
Figure 4:
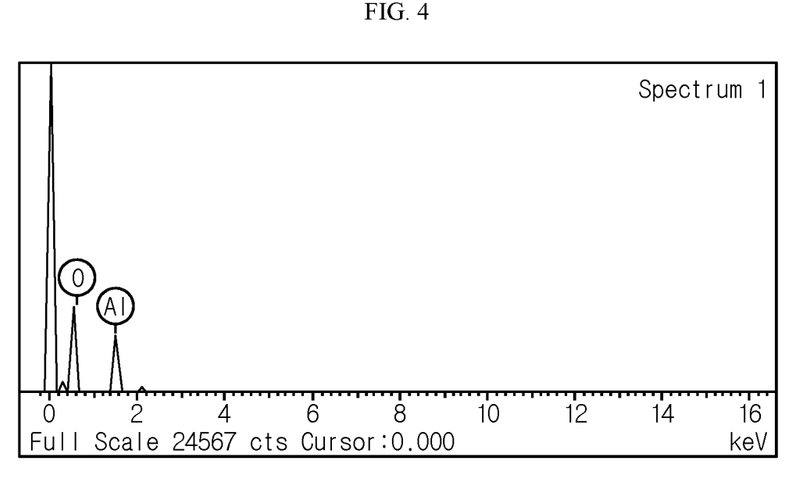
FIG. 4 illustrates a mapping graph obtained from the EDX analysis of aluminum hydroxide before introducing fluorine particles thereto according to Preparation Example 1.

Meanwhile, FIG. 2 illustrates the surface shape of $Al(OH)_3$ before fluorine (F) is introduced thereto and the ingredient analysis region thereof determined by EDX, and FIG. 4 illustrates the EDX mapping graph thereof. Referring to FIG. 2 and FIG. 4, no fluorine (F) is observed on the surfaces of aluminum hydroxide particles before introducing fluorine thereto. The EDX analysis results of the surfaces of $Al(OH)_3$ before fluorine (F) is introduced thereto are shown in the following Table 2.

TABLE 2

| Element | Weight % | Atomic % |
| --- | --- | --- |
| Oxygen (O) | 72.12 | 81.36 |
| Fluorine (F) | 0 | 0 |
| Aluminum (Al) | 27.88 | 18.64 |
| Totals | 100 | 100 |

Example 1

PVDF-HFP (HFP substitution ratio ~15%) and PVDF-CTFE (CTFE substitution ratio ~20%) were dissolved in acetone at a concentration of 10 wt % to obtain 400 g of a polymer solution. Herein, PVDF-HFP and PVDF-CTFE were introduced at a weight ratio of 3:1. Then, 100 g of the heat resistant particles obtained from Preparation Example 1 and 2 g of isopropyl trioleyl titanate as a dispersing agent were introduced to and dispersed in the resultant solution through ball milling to prepare slurry for a heat resistant coating layer. Herein, the slurry had a solid content of 18 wt %. After that, the slurry was coated on a porous substrate (polyethylene, thickness 12 μm, porosity 43 vol %) at 23° C. under a relative humidity of 45% through a dip coating process, followed by drying. The heat resistant coating layer was formed on both surfaces of the substrate to a total thickness of 6 μm. The coating layer had a packing density of 1.01 g/cm³ in the heat resistant coating layer.

Example 2

Binder resin 1 (PVDF-HFP, HFP substitution ratio ~15%) and binder resin 2 (PVDF-CTFE, CTFE substitution ratio ~20%) were dissolved in acetone at a concentration of about 10 wt % to obtain 400 g of a mixed polymer solution. Herein, PVDF-HFP and PVDF-CTFE were introduced at a weight ratio of 3:1. Then, 100 g of the heat resistant particles obtained from Preparation Example 1 and 2 g of isopropyl trioleyl titanate as a dispersing agent were introduced to and dispersed in the resultant solution through ball milling to prepare slurry for a heat resistant coating layer. Herein, the slurry had a solid content of 18 wt %. After that, the slurry was coated on a porous substrate (polyethylene, thickness 12 μm, porosity 43 vol %) at 23° C. under a relative humidity of 45% through a dip coating process, followed by drying. The heat resistant coating layer was formed on both surfaces of the substrate to a total thickness of 8 μm. The coating layer had a packing density of 1.11 g/cm³ in the heat resistant coating layer.

Comparative Example 1

A separator having a heat resistant coating layer was obtained in the same manner as Example 1, except that $Al(OH)_3$ ($D_{50}$ 1.2 μm) powder containing no fluorine (F) introduced thereto was used. The coating layer had a packing density of 0.98 g/cm³ in the heat resistant coating layer.

Comparative Example 2

A separator having a heat resistant coating layer was obtained in the same manner as Example 1, except that Al(OH)$_3$ (particle size (D$_{50}$) 1.2 μm) powder containing no fluorine (F) introduced thereto was used. The coating layer had a packing density of 1.00 g/cm$^3$ in the heat resistant coating layer.

Method for Determination of Resistance

Each of the separators according to Examples and Comparative Examples was determined for resistance by the following method. Each of the separators according to Examples and Comparative Examples was cut and disposed in 2032 Coin Cell available from Hoshen Co., ethylene carbonate/ethyl methyl carbonate (weight ratio 3:7, 1M LiPF$_6$) was injected thereto so that the separator might be impregnated therewith, and electrical resistance was determined by EIS (Electrochemical Impedance Spectroscopy) at 25° C. through alternating current measurement.

Method for Determination of Shrinkage

Each of the separator samples according to Examples and Comparative Examples was cut into a size of 50 mm (length)×50 mm (width) to prepare a specimen. The specimen was allowed to stand in an oven heated to 150° C. for 30 minutes. Then, the specimen was recovered and a change in length was measured in the machine direction (MD) and transverse direction (TD).

Shrinkage (%)={(Length before shrinking−Length after shrinking)/Length before shrinking}×100

TABLE 3

| Separator | Ex. 1 | Ex. 2 | Comp. Ex. 1 | Comp. Ex. 2 |
|---|---|---|---|---|
| Resistance (ohm) | 0.79 | 0.86 | 1.02 | 1.15 |
| Shrinkage (MD/TD, %) | 25/23 | 10/7 | 30/27 | 13/11 |
| Thickness of heat resistant coating layer | 6 μm | 8 μm | 6 μm | 8 μm |
| Packing density | 1.01 g/cm$^3$ | 1.11 g/cm$^3$ | 0.98 g/cm$^3$ | 1.00 g/cm$^3$ |

As can be seen from Table 3, each of the separators according to Examples 1 and 2 shows higher packing density of the coating layer and improved resistance characteristics, as compared to each of the separators according to Comparative Examples 1 and 2 having the same thickness. In addition, it can be seen that each of the separators according to Examples shows higher packing density of the coating layer and lower shrinkage as compared to the separators according to Comparative Examples, and thus has higher heat resistance and stability. It is thought that such an increase in packing density of the coating layer results from introduction of fluorine to the surfaces of inorganic particles, an increase in smoothness of the particle surfaces, and improvement of the packing density of the coating layer.

What is claimed is:

1. A separator for an electrochemical device, comprising:
a porous polymer substrate, and
a heat resistant coating layer on at least one surface of the porous polymer substrate,
wherein the heat resistant coating layer comprises heat resistant particles, and the heat resistant particles comprise a particle-shaped inorganic material, and fluorine (F) atoms doped to a surface of the particle-shaped inorganic material,
wherein the particle-shaped inorganic material comprises at least one of alumina (Al$_2$O$_3$), aluminum hydroxide (Al(OH)$_3$), boehmite (AlOOH), or B(OH)$_3$, and the fluorine (F) atoms are doped in the form of AlF$_3$ or BF$_3$, and
wherein the heat resistant particles comprise fluorine (F) atoms at 5 atomic % or more relative to a total atomic % of ingredients on the surface of the heat resistance particles.

2. The separator for the electrochemical device according to claim 1, wherein the particle-shaped inorganic material is stable against oxidation and/or reduction in a range of operating voltage of an electrochemical device.

3. The separator for the electrochemical device according to claim 1, wherein the heat resistant particles comprise aluminum hydroxide (Al(OH)$_3$) containing fluorine (F) atoms doped to the surface.

4. The separator for the electrochemical device according to claim 1, wherein the fluorine atoms are doped to the surfaces of the heat resistant particles by mixing an aqueous hydrogen fluoride (HF) solution with the particle-shaped inorganic material and carrying out a heat treatment.

5. The separator for the electrochemical device according to claim 1, wherein the heat resistant coating layer additionally comprises undoped inorganic particles, and
wherein the heat resistant particles are present in an amount of 50 wt % or more based on 100 wt % of a mixture of the doped inorganic particles and the undoped inorganic particles present in the heat resistant coating layer.

6. The separator for the electrochemical device according to claim 1, wherein the heat resistant particles have an average particle diameter of 0.01 μm to 2 μm.

7. The separator for the electrochemical device according to claim 1, wherein the heat resistant coating layer has a packing density of 0.8 g/cm$^3$ or more, and has a resistance of less than 1 ohm with the proviso that the heat resistant coating layer of the separator has a thickness of less than 10 μm.

8. An electrochemical device, comprising:
a negative electrode,
a positive electrode,
a separator interposed between the negative electrode and the positive electrode, and
an electrolyte,
wherein the separator is the separator as defined in claim 1, and the electrolyte comprises, as a lithium salt, at least one of LiPF$_6$, LiBF$_4$, LiAsF$_6$, LiCF$_3$SO$_3$, LiN(CF$_3$SO$_2$)$_2$ or LiC(CF$_2$SO$_2$)$_3$.

9. The separator for the electrochemical device according to claim 1, wherein the fluorine (F) atoms are bonded to the surface of the particle-shaped inorganic material.

10. The separator for the electrochemical device according to claim 1, wherein the heat resistant coating layer has a packing density of 0.8 g/cm$^3$ or more.

11. The separator for the electrochemical device according to claim 1, wherein the heat resistant coating layer has a packing density of 1.01 g/cm$^3$ or more.

* * * * *